(12) United States Patent
Boonpongmanee

(10) Patent No.: US 9,140,323 B2
(45) Date of Patent: Sep. 22, 2015

(54) DRUM AND CONSTRICTING DRUM ASSEMBLY

(71) Applicant: Eaton Corporation, Cleveland, OH (US)

(72) Inventor: Thaveesak Boonpongmanee, Westlake, OH (US)

(73) Assignee: EATON CORPORATION, Cleveland, OH (US)

( * ) Notice: Subject to any disclaimer, the term of this patent is extended or adjusted under 35 U.S.C. 154(b) by 43 days.

(21) Appl. No.: 13/799,232

(22) Filed: Mar. 13, 2013

(65) Prior Publication Data

US 2014/0262657 A1   Sep. 18, 2014

(51) Int. Cl.
| | |
|---|---|
| *F16D 55/08* | (2006.01) |
| *F16D 65/10* | (2006.01) |
| *F16D 25/04* | (2006.01) |
| *F16D 49/00* | (2006.01) |
| *F16D 49/14* | (2006.01) |
| *F16D 65/00* | (2006.01) |
| *F16D 69/04* | (2006.01) |
| *F16D 13/10* | (2006.01) |
| *F16D 121/02* | (2012.01) |
| *F16D 125/14* | (2012.01) |

(52) U.S. Cl.
CPC .............. *F16D 65/10* (2013.01); *F16D 13/10* (2013.01); *F16D 25/046* (2013.01); *F16D 49/00* (2013.01); *F16D 49/14* (2013.01); *F16D 65/0031* (2013.01); *F16D 69/0416* (2013.01); *F16D 2069/0433* (2013.01); *F16D 2069/0466* (2013.01); *F16D 2121/02* (2013.01); *F16D 2125/14* (2013.01)

(58) Field of Classification Search
CPC ......... F16D 65/10; F16D 49/00; F16D 49/14; F16D 69/0416
USPC ............... 188/72.1, 73.1, 74, 76, 77 R, 77 W, 188/264 R, 264 A, 264 AA, 264 W; 192/72, 192/73, 79, 85.03, 85.12, 85.13
See application file for complete search history.

(56) References Cited

U.S. PATENT DOCUMENTS

| | | | | |
|---|---|---|---|---|
| 1,818,100 | A * | 8/1931 | Shields | 188/218 R |
| 2,870,891 | A * | 1/1959 | Eakin et al. | 192/85.13 |
| 3,022,877 | A * | 2/1962 | Fawick | 192/85.13 |
| 3,631,943 | A * | 1/1972 | Roob et al. | 188/264 D |
| 4,190,136 | A * | 2/1980 | Collins et al. | 188/367 |
| 4,944,370 | A * | 7/1990 | Chambers et al. | 188/71.5 |
| 4,958,713 | A * | 9/1990 | Latsko | 192/85.13 |
| 5,092,443 | A * | 3/1992 | Nomura | 192/107 M |
| 5,655,637 | A * | 8/1997 | Hays | 192/70.14 |
| 6,935,470 | B1 * | 8/2005 | Smith, Jr. | 188/218 XL |
| 2005/0217950 | A1 * | 10/2005 | Jolley et al. | 188/218 R |

FOREIGN PATENT DOCUMENTS

WO    WO 2011/027354 A1    3/2011

* cited by examiner

*Primary Examiner* — Pamela Rodriguez
(74) *Attorney, Agent, or Firm* — Daniel S. Kalka

(57) ABSTRACT

A drum with replaceable shield elements for a constricting brake assembly and improved constricting drum brake assembly with replaceable shield elements for transferring heat from the brake and providing wear resistance for the drum.

11 Claims, 6 Drawing Sheets

DRUM AND CONSTRICTING DRUM ASSEMBLY

BACKGROUND

The present disclosure relates to an improved drum and constricting drum assembly for a constricting drum brake or clutch assembly of the particular type having an inflatable tube disposed in a housing about the drum used in a wide variety of industrial and commercial applications requiring braking action.

In a constricting pneumatic drum brake, an inflatable tube in a brake housing is employed and expanded with a fluid at selected times for braking action or in other applications as a clutch. As used herein the term "constricting drum brake assembly" or "pneumatic constricting brake assembly" or the like is intended to encompass a brake assembly that can function either as a brake, a clutch, or both through a braking action. The inflatable tube acts upon friction elements causing them to engage against the outer surface of a drum for the braking action. Heat is generated during the braking action and this heat needs to be dissipated in an efficient manner to prolong the life of the drum and other components of the brake assembly, the input shaft, and the workpiece connected to the input shaft affected by the heat.

Thus, there still exists a need for an improved drum and constricting drum brake assembly which dissipates the heat generated during the braking action to reduce the surface temperature of the drum and surrounding areas, and extends the life of the drum and other components.

SUMMARY

The present disclosure describes an improved constricting drum for a constricting drum assembly and constricting drum brake assembly for use as a brake or a clutch.

The improved constricting drum brake assembly comprises a housing with an annular array of friction elements operably disposed therein for radial movement. A drum is disposed for rotary movement with respect to the housing. The drum has an annular hub and an annular outer surface disposed radially outwardly of the hub about the outer periphery for the braking action. An inflatable tube is disposed between the housing and friction elements and is operable upon inflation to move the friction elements into contact with the outer surface for the braking action. An annular array of replaceable shield elements is disposed radially on the annular outer surface of the drum for reducing surface temperature and wear of the drum.

DETAILED DESCRIPTION

Figure 1:
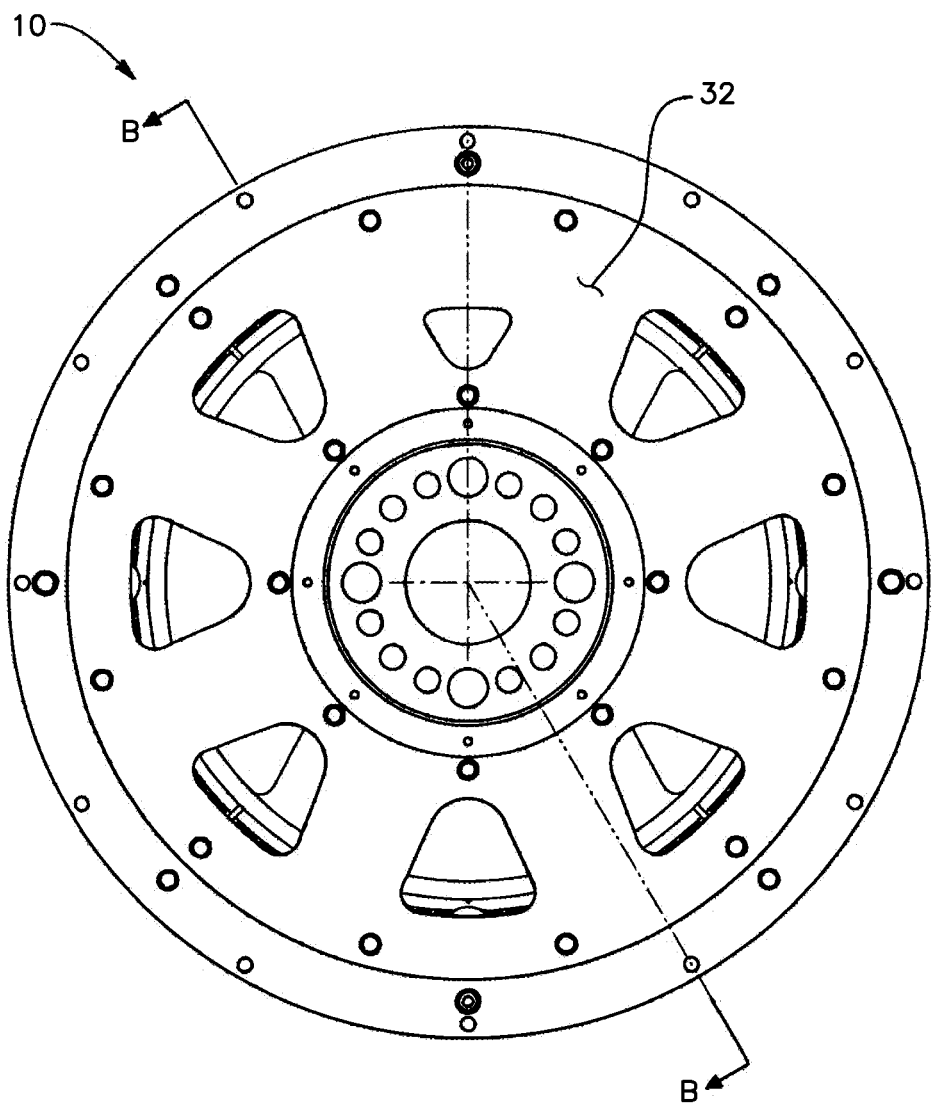
FIG. 1 is a side elevation view of one embodiment of the brake assembly of the present disclosure showing a cover plate in place.
Figure 2:
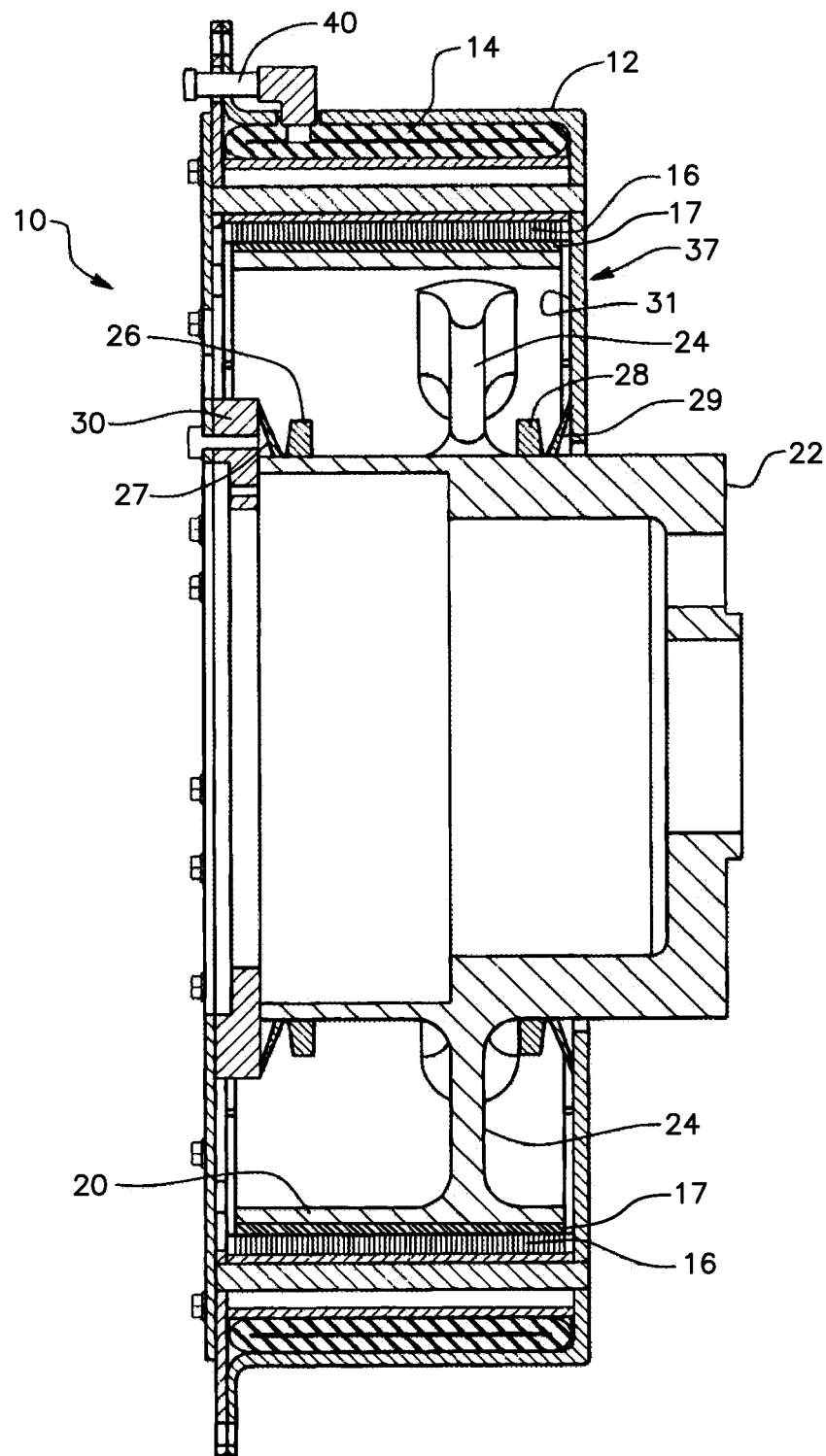
FIG. 2 is a sectional view along section-indicating lines B-B of the brake of FIG. 1.
Figure 3:
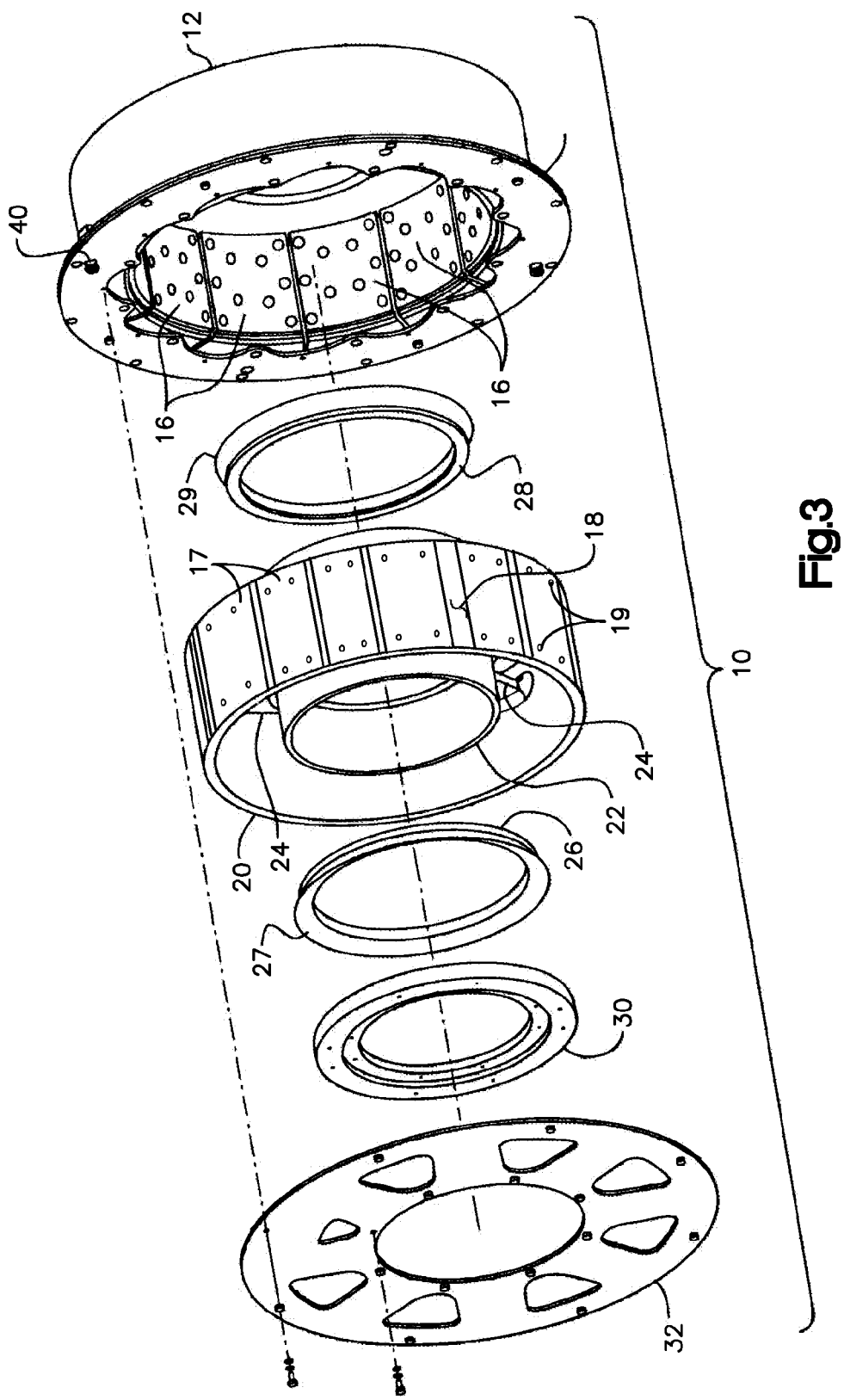
FIG. 3 is an exploded view of the brake assembly of FIG. 1.
Figure 4:
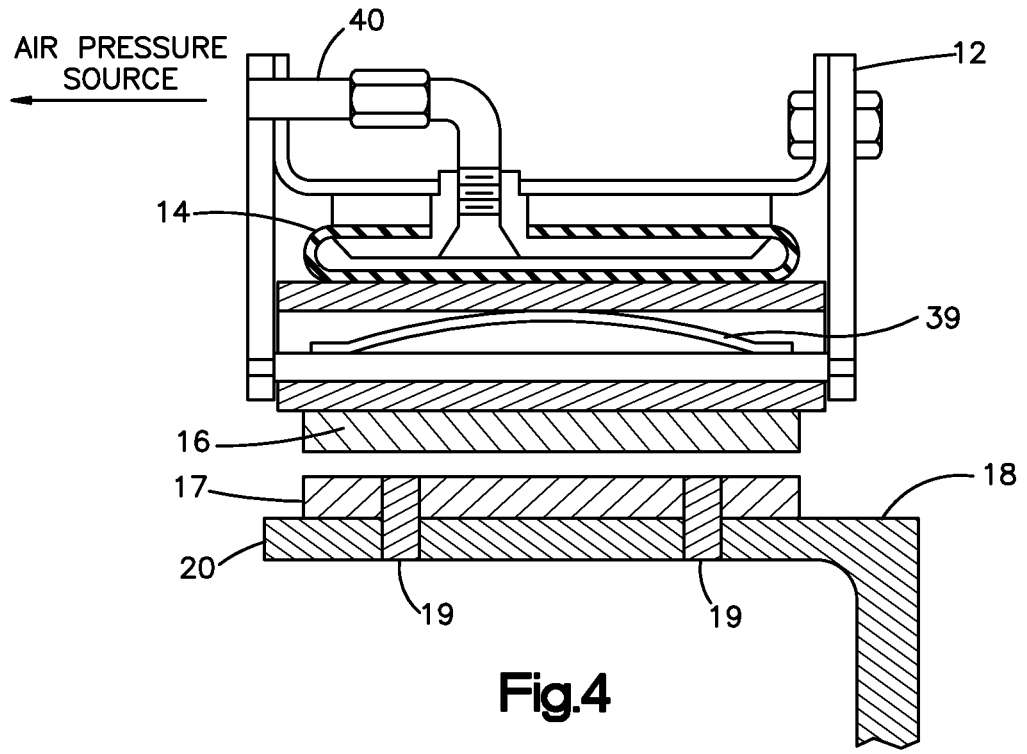
FIG. 4 is a view of a portion of FIG. 2 showing the brake in the unactuated condition.

FIGS. 1-5 of the drawings illustrate a brake assembly designated generally at 10 with stationary brake element or housing 12 having, in the exemplary illustrated version, a cylindrical cup shaped configuration with a cover panel 32 which contains an annular inflatable tube 14 disposed about the interior of the housing; and, tube 14 surrounds an annular array of friction elements 16 disposed within the housing. Drum 20 has an inner annular hub 22 supported by spokes 24 and the hub has a hollow interior.

Upon inflation, tube 14 expands causing friction elements 16 to be constricted radially inwardly and causes the radially inner surfaces of the friction elements 16 to frictionally engage a plurality of replaceable shield elements 17 disposed preferably in an annular array on the outer braking surface or circumference 18 of rotating drum 20 for effecting the braking action.

A pair of annular seals 26, 28 may be disposed, one on each opposite axial side of the hub 22 of the rotating drum and are secured thereon for rotation therewith. In the exemplary version illustrated, the seals 26, 28 each include a relatively thin wiper portion 27, 29 provided respectively thereon; and, the wipers 27, 29 may be formed integrally therewith. Seals 26, 28 may be formed of any suitable material, as, for example elastomeric material. The wipers 27, 29 are operative respectively to contact in rotary sealing engagement stationary sealing surfaces 30, 31 provided on the housing and correspondingly located. At least one of the surfaces, such as surface 30, may include a bearing mount such as the exemplary illustrated adaptor ring. It will be understood that the ring 30 may include a mounting bearing (not shown) for the hub 22.

Figure 5:
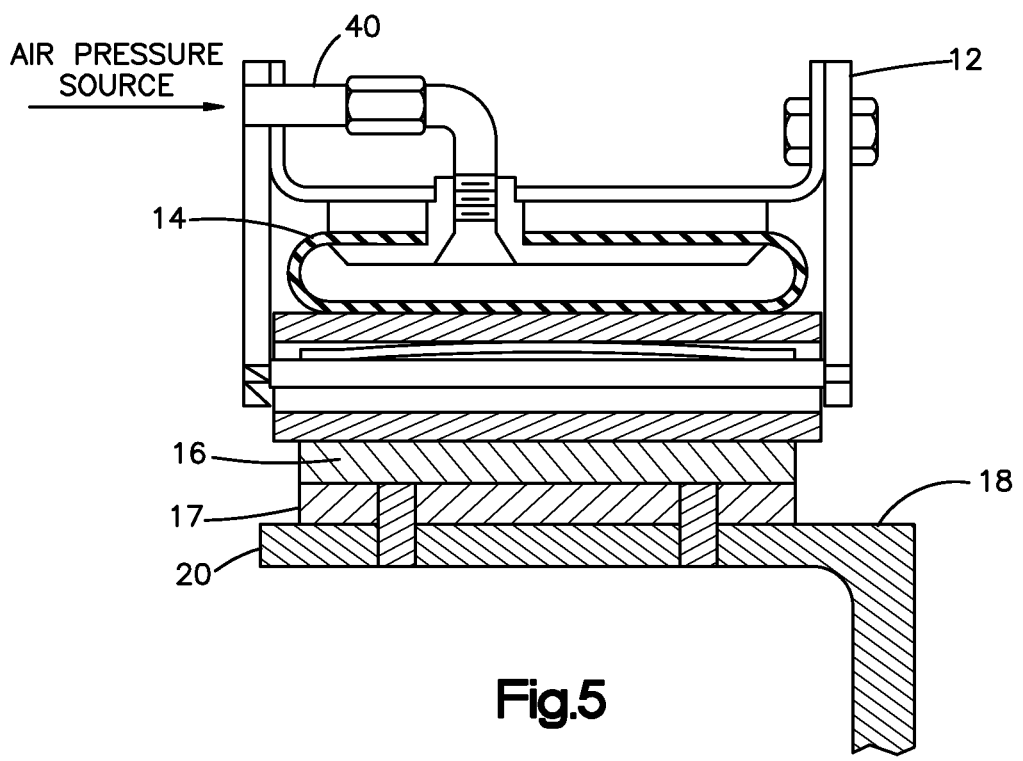
FIG. 5 is a view similar to FIG. 4 showing the brake in the actuated condition.

In operation, upon inflation of the annular tube 14 through the air supply connection 40, the annular tube 14 causes friction elements 16 to move radially inwardly, or to constrict, as shown in FIG. 5, against the shield elements 17 disposed on the outer surface 18 of the brake drum. In the exemplary version illustrated in FIGS. 4 and 5, a release spring(s) 39 is/are incorporated between inflatable tube 14 and brake element 16. The shield elements may be disposed in an array on the outer surface 18 of the drum 20 in select locations, if desired, for example opposite the friction elements 16.

The shield elements 17 are preferably composed of a metal matrix composite material, and more preferably made from an aluminum matrix composite material. The shield elements 17 improve thermal efficiency by transferring heat from the surface which reduces the surface temperature of the drum and the surrounding area. The shield elements 17 additionally provide wear resistance to further prolong the life of the drum. This allows for replacement of the shield elements instead of the drum. The thermal conductivity of the shield elements made from a metal matrix composite material is approximately five times higher than that of the ductile iron material of the drum. Each of the shield elements 17 are affixed to the drum with one or more fasteners 19 such as bolts, screws, rivets, or the like that allow replacement of the shield elements when worn.

Figure 6:
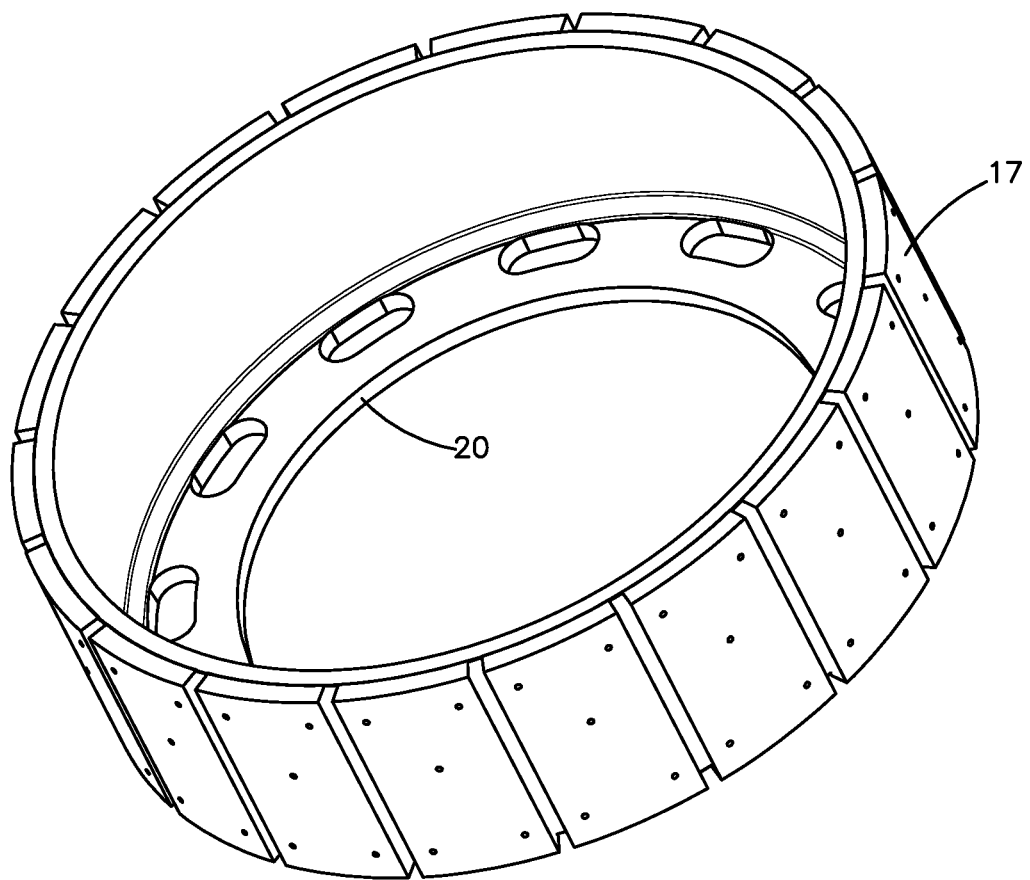
FIG. 6 is a perspective view of an alternate embodiment of the improved drum according to the present disclosure.

An alternate embodiment of the improved drum according to the present disclosure is shown in FIG. 6. In this embodiment, the shield elements are adhesively affixed to the annular outer surface 18 of the drum 20. When the shield elements 17 wear to the point they require replacement, the shield elements are removed and new shields attached. Alternatively, the shield elements 17 may be adhesively bonded to a replacement plate of metal (not shown) which is then attached to the outer surface 18 of the drum 20 with fasteners or even welding the replacement plate directly to the drum.

Figure 7:
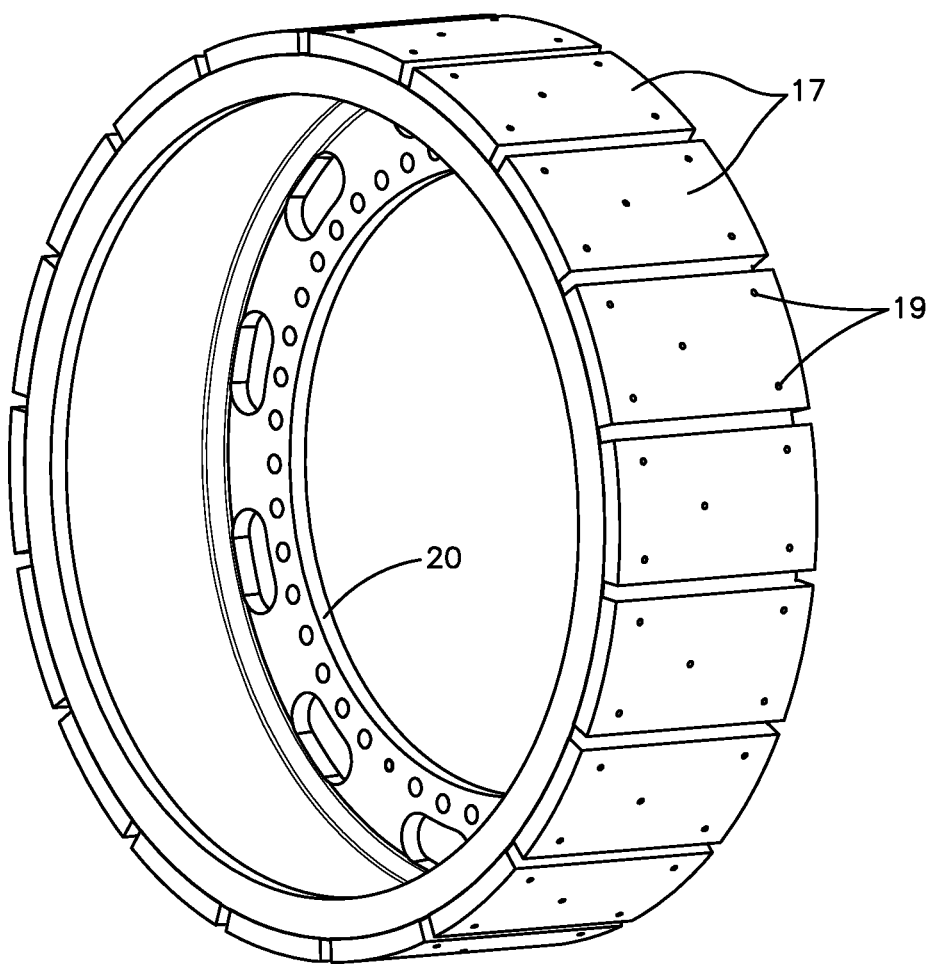
FIG. 7 is a view similar to FIG. 6 showing an embodiment of the improved drum according to the present disclosure.

FIG. 7 is a view similar to FIG. 6 but shows the shield elements 17 attached to the drum 20 with multiple fasteners in each element.

The exemplary embodiments have been described with reference to the present practice. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

I claim:

1. An improved constricting pneumatic drum brake assembly comprising:
   (a) a housing with an annular array of friction elements operably disposed therein for radial movement;
   (b) a drum disposed for rotary movement with respect to the housing, the drum having an annular hub and an annular outer surface disposed radially outwardly of the hub about the outer periphery;
   (c) an inflatable tube disposed between the housing and friction elements and operable upon inflation to move the friction elements into contact with the outer surface; and
   (d) a plurality of replaceable wear resistant shield elements attached directly to the annular outer surface of the drum and disposed radially thereon for reducing surface temperature and wear of the drum, the plurality of shield elements being disposed in an annular array substantially about the entire outer circumference of the annular outer surface of the drum.

2. The drum brake defined in claim 1, wherein each shield element comprises a thermally conductive material.

3. The drum brake defined in claim 1, wherein each shield element is affixed to the drum with a plurality of fasteners.

4. The drum brake defined in claim 1, wherein each shield element is affixed to the drum with an adhesive.

5. The drum brake defined in claim 1, wherein each shield element comprises a metal matrix composite material.

6. The drum brake defined in claim 5, wherein each shield element comprises an aluminum matrix composite material.

7. An improved drum for a constricting pneumatic brake assembly, comprising:
   (a) an annular drum disposed for rotary movement with respect to a constricting brake housing, the drum having an annular hub and an annular outer surface disposed radially outwardly of the hub about the outer periphery; and
   (b) a plurality of replaceable wear resistant shield elements attached directly to the annular outer surface of the drum and disposed radially thereon for reducing surface temperature and wear of the drum, the plurality of replaceable wear resistant shield elements being disposed in an annular array substantially about the entire outer circumference of the annular outer surface of the drum.

8. An improved drum defined in claim 7, wherein each of the replaceable shield elements are attached to the drum with fasteners.

9. An improved drum defined in claim 8, wherein each of the replaceable shield elements are composed of an aluminum matrix composite material.

10. An improved drum defined in claim 7, wherein each of the replaceable shield elements are composed of a metal matrix material.

11. An improved drum defined in claim 7, wherein each of the replaceable shield elements are affixed to the drum with an adhesive.

\* \* \* \* \*